May 17, 1927.

M. VON HALLE

Re. 16,626

CORSET

Original Filed March 31, 1924 2 Sheets-Sheet 1

INVENTOR
Millard Von Halle
BY
ATTORNEY

May 17, 1927. M. VON HALLE Re. 16,626

CORSET

Original Filed March 31, 1924 2 Sheets-Sheet 2

INVENTOR
Millard Von Halle
BY
ATTORNEY

Reissued May 17, 1927. Re. 16,626

UNITED STATES PATENT OFFICE.

MILLARD VON HALLE, OF PALISADES PARK, NEW JERSEY, ASSIGNOR TO THE STANDARD CORSET COMPANY, OF NEW YORK, N. Y., A CORPORATION OF MASSACHUSETTS.

CORSET.

Original No. 1,507,403, dated September 2, 1924, Serial No. 703,054, filed March 31, 1924. Application for reissue filed September 1, 1925. Serial No. 53,954.

The object of this invention is to provide a corset that will not only serve all the purposes of an ordinary corset but will also provide an abdominal support that will not only elevate and support the abdomen but will admit of the pressure and pull of said support being varied at will to meet the requirements of the wearer, a feature very essential when the wearer has undergone a surgical operation.

A concrete embodiment of the invention is shown in the accompanying drawings in which.

Figure 1:
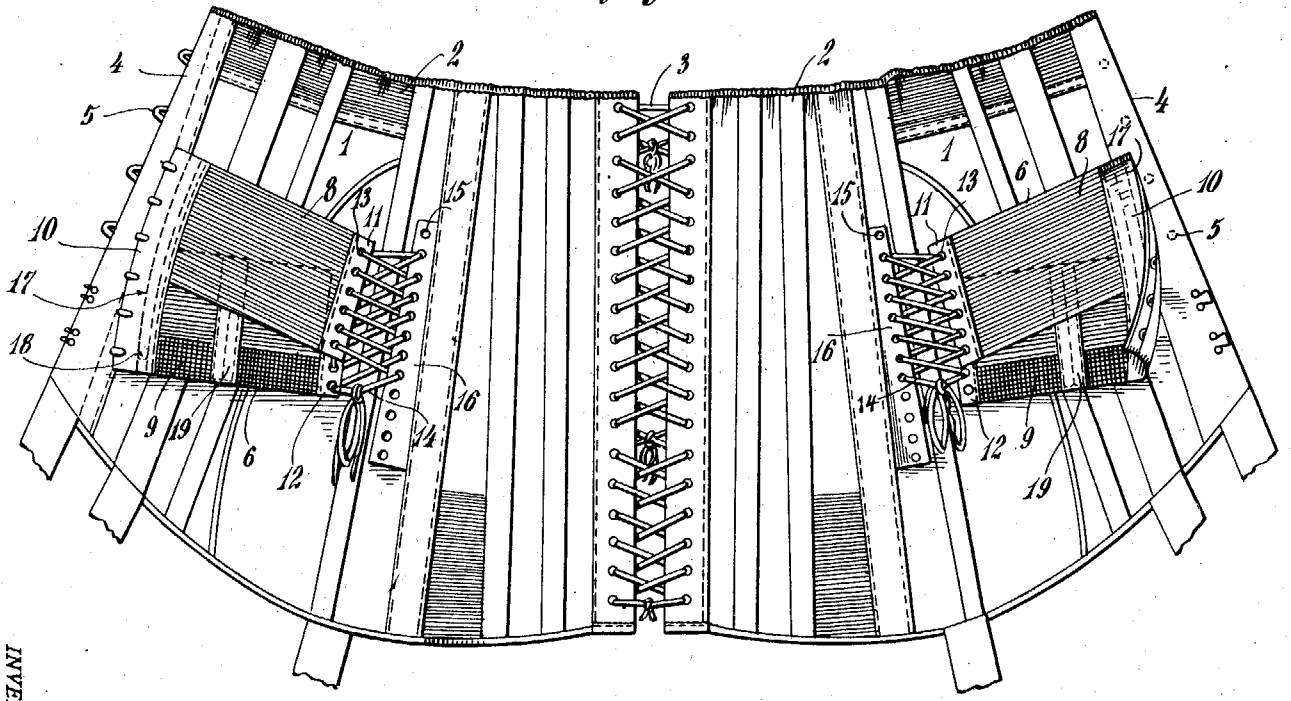
Fig. 1 is an elevation of the inner side of an open corset showing the abdominal lifting and supporting means removably adjustably attached thereto.
Figure 2:
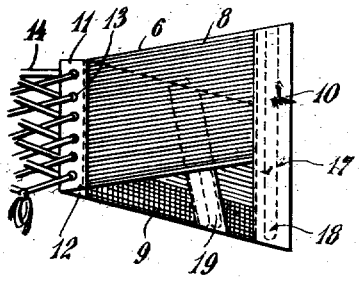
Fig. 2 is an enlarged detail elevation of one section of the abdominal lifting and supporting means of Fig. 1 showing one adjustment of the parts.
Figure 3:
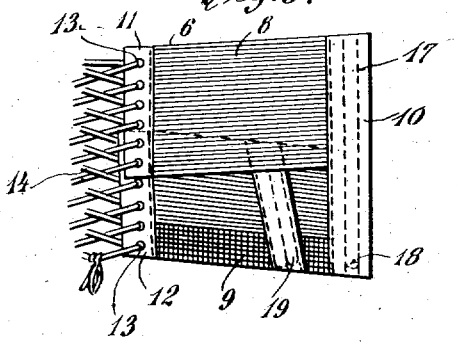
Fig. 3 is a similar view showing another adjustment of the parts.

In Fig. 1, 1 is the inner side of the usual body portions 2 of a corset; 3 is the usual lacing that joins the portions 2 together at the back; 4 is the front edges of a corset and 5 the usual means of fastening these edges together when the corset has been placed in position on the body of the wearer. 6 are the two members here comprising the abdominal lifting and supporting means 7, each member comprising two bands of resilient material 8 and 9 permanently fastened together at one end 10 in fixed, overlapped and angular relation to each other and provided with fastening means for connecting the two members together when the corset has been placed in position on the body of the wearer. The fixed angular relation of the two bands of each member is such as to cause the bottom edges of the abdominal lifting and supporting means 7, when the two members 6 are fastened together, to normally conform to the curvature of the lower part of the abdomen of the human body. It will be readily understood that this fixed angular relation varies slightly with the size of the corset. The other ends 11 and 12 of the bands 8 and 9 are free and are here provided with eyelets 13 for the accommodation of a lace 14 the eyelets of one of the bands 8, 9 of each member 6 being so spaced as to register with the eyelets of the other band of said member and so spaced as to register with eyelets 15 in a tab 16 on the inner side of the corset at either side of and adjacent to the front center of the corset so that the lace 14 may be threaded in the eyelets 13 and 15 to secure the abdominal lifting and supporting means to the corset, the tab 16 being sufficiently long and adequately provided with eyelets 15 to admit of the abdominal support 7 being adjustable in its up-and-down position on the body of the wearer and to admit, when desired, of but a very slight degree of overlapping of the bands 8 and 9 at their free ends 11 and 12. The ends of the bands 8 and 9 being free, the angular relation of these bands may be varied by means of the lace 14 and eyelets 13 as shown in Figs. 2 and 3 in the former of which these bands have been overlapped at their ends 11 and 12 and the lace threaded through the superimposed eyelets 13 to hold them in position to give the greatest extent of elevation and pressure while in the latter, Fig. 3, the bands 8 and 9 have been overlapped at their ends 11 and 12 and the lace threaded through the superimposed eyelets 13 to hold the bands 8 and 9 in position to give the least extent of elevation and pressure. In Fig. 1, the bands 8 and 9 are overlapped and laced together in an intermediate or normal position.

Figure 4:
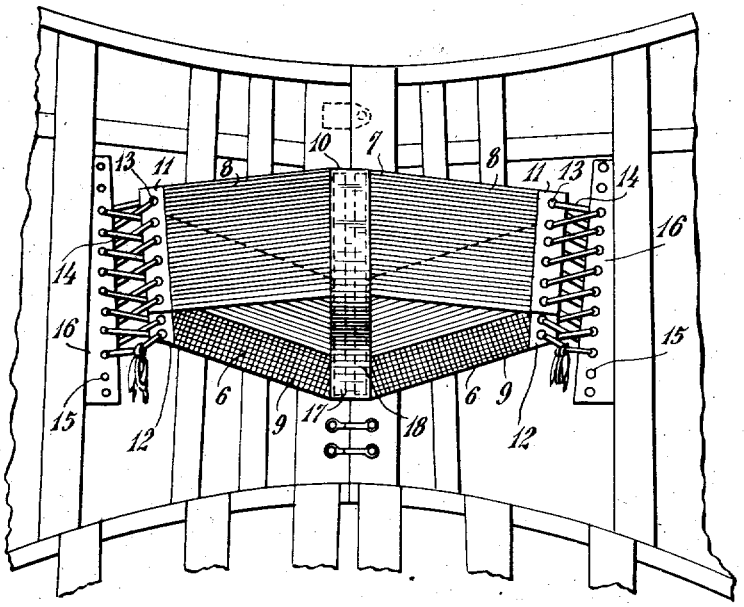
Fig. 4 is a detail elevation of a portion of the inner side of a corset adjacent the front showing my invention applied to a modification of the abdominal lifting and supporting means.

Fig. 4 shows another form of abdominal lifting and supporting means 7 in which the members 6 are permanently connected together at their edges 10 but with the ends 11 and 12 of the bands 8 and 9 free and provided with the means 13, 14 for varying the angular relation of these bands.

The bands 8 and 9 may operate therefore separately or conjunctively or coordinately to produce the necessary corrective effect and to admit of the desired regulations so essential in surgical cases and the arrangement and adjustability of the parts admit of regulating and controlling the degree of pressure and control of the degree of elevation and support of the abdomen as required by the varying conditions of the wearer and the various conditions to be met with in different persons.

The abdominal lifting and supporting means are preferably cup-shape being provided along the edges 10 of the members 6 of the abdominal lifting and supporting means with vertical strips 17 of flexible material, such as whale bone, which are bent into curved position, to admit of the support being given an outward and downward curve through the center so that its lower edge 18 is inclined toward the body of the wearer and falls under the lower part of the abdomen to assist in elevating the abdomen when the resilient bands 8 and 9 are flexed into adjusted position on the body of the wearer.

The lower bands 9 of each of the members 6 may also be provided with similar strips 19 of flexible material bent into curved position for the same purpose as the strips 17.

Likewise in that form of the invention shown in Fig. 4 vertical strips 17 are provided at the center of the lifting and supporting means 7 for the same purpose.

Other suitable means may be substituted for the eyelet and lace arrangement here shown.

This invention may, of course, be applied to a corsetlette or corset-waist.

By the term "connected" as used in the claims to describe members 6 it is intended to cover both forms of the invention shown in Figs. 1 and 4. In the construction of Fig. 1 said members are connected when attached together by ordinary fastening means. In the construction of Fig. 4 they are permanently connected.

I claim:

1. The combination with a corset, of cup-shape abdominal lifting and supporting means adjustably attached to the corset including: two connected members, one member on each side of the inside front of the corset and each member consisting of a plurality of bands of resilient material fastened together in overlapped angular relation with respect to each other at their ends nearest the central front portion of the corset, their other ends being free, and means for varying, with respect to each other, the angular relation and extent of overlapping of the bands of each member to thereby vary at will the curvature or the pull or pressure of the cup-shape lifting and supporting means.

2. The combination with a corset, of abdominal lifting and supporting means adjustably attached to the corset including: two connected members, one member on each side of the inside front of the corset and each member consisting of two bands of resilient material fastened together at one of their ends in overlapped angular relation with respect to each other, their other ends being free, and means for adjusting individually each band of each member with respect to its angular relation to and overlapping of the other band of said member and with respect to the corset.

3. The combination with a corset, of abdominal lifting and supporting means adjustably attached to the corset including: two connected members, one member on each side of the inside front of the corset and each member consisting of two bands of resilient material fastened together at one of their ends in overlapped angular relation with respect to each other, their other ends being free, and means for adjusting individually each band of each member with respect to its angular relation to and overlapping of the other band of said member and with respect to the corset and for removably and adjustably attaching each of the members of said lifting and supporting means to the corset.

4. The combination with a corset, of abdominal lifting and supporting means adjustably attached to the corset including: two connected members, one member on each side of the inside front of the corset and each member consisting of two bands of resilient material fastened together at one of their ends in overlapped angular relation with respect to each other, their other ends being free, and means for removably and adjustably securing the bands of each member to the corset to thereby adjust each member independently of the other and the bands of each member individually.

5. An article of manufacture to be placed around the body of the wearer consisting of: carrying means, and cup-shape abdominal lifting and supporting means adjustably attached to the carrying means including: two connected members, one member on each side of the longitudinal center of said lifting and supporting means and each member consisting of a plurality of bands of resilient material fastened together in overlapped angular relation with respect to each other at their ends nearest the longitudinal center of the lifting and supporting means, their other ends being free, and means for varying, with respect to each other, the angular relation and extent of overlapping of the bands of each member to thereby vary at will the curvature or the pull or pressure of the cup-shape lifting and supporting means.

6. An article of manufacture to be placed around the body of the wearer consisting of: carrying means, and abdominal lifting and supporting means adjustably attached to said carrying means, the abdominal lifting and supporting means including: two connected members, one member on each side of the longitudinal center of the lifting and supporting means and each member consisting of two bands of resilient material fastened together at one of their ends in overlapped angular relation with respect to each other, their other ends being free, and means for adjusting individually each band of each member with respect to its angular relation to and overlapping of the other band of said member and with respect to the carrying means.

7. An article of manufacture to be placed around the body of the wearer consisting of: carrying means, and abdominal lifting and supporting means adjustably attached to said carrying means, the abdominal lifting and supporting means including: two connected members, one member on each side of the longitudinal center of said lifting and supporting means, each member consisting of two bands of resilient material fastened together at one of their ends in overlapped angular relation with respect to each other, their other ends being free, and means for adjusting individually each band of each member with respect to its angular relation to and overlapping of the other band of said member and with respect to the carrying means and for removably and adjustably attaching each of the members of said lifting and supporting means to the carrying means.

8. An article of manufacture to be placed around the body of the wearer consisting of: carrying means, and abdominal lifting and supporting means adjustably attached to the carrying means, said lifting and supporting means including: two connected members, one member on each side of the longitudinal center of the lifting and supporting means and each member consisting of two bands of resilient material fastened together at one of their ends in overlapped angular relation with respect to each other, their other ends being free, and means for removably and adjustably securing the bands of each member to the carrying means to thereby adjust each member independently of the other and the bands of each member individually.

Signed at Holyoke, in the county of Hampden and Commonwealth of Massachusetts, this 25th day of August, 1925.

MILLARD VON HALLE.